United States Patent
Li

(10) Patent No.: US 11,307,302 B2
(45) Date of Patent: Apr. 19, 2022

(54) METHOD AND DEVICE FOR ESTIMATING AN ABSOLUTE VELOCITY OF AN OBSTACLE, AND NON-VOLATILE COMPUTER-READABLE STORAGE MEDIUM

(71) Applicant: Baidu Online Network Technology (Beijing) Co., Ltd., Beijing (CN)

(72) Inventor: Chongchong Li, Beijing (CN)

(73) Assignee: Baidu Online Network Technology (Beijing) Co., LTD, Beijing (CN)

( * ) Notice: Subject to any disclaimer, the term of this patent is extended or adjusted under 35 U.S.C. 154(b) by 272 days.

(21) Appl. No.: 16/521,112

(22) Filed: Jul. 24, 2019

(65) Prior Publication Data

US 2020/0081112 A1    Mar. 12, 2020

(30) Foreign Application Priority Data

Sep. 7, 2018    (CN) .......................... 201811045665.9

(51) Int. Cl.
  *G01S 13/58*    (2006.01)
  *G01S 13/931*    (2020.01)

(52) U.S. Cl.
  CPC ............ *G01S 13/58* (2013.01); *G01S 13/931* (2013.01); *G01S 2013/932* (2020.01)

(58) Field of Classification Search
  CPC ...... G01S 13/58; G01S 13/726; G01S 13/931; G01S 2013/932
  See application file for complete search history.

(56) References Cited

U.S. PATENT DOCUMENTS

| 8,611,585 B2 | 12/2013 | Zhang et al. |
| 9,082,014 B2 | 7/2015 | Terrazas et al. |
| 9,760,806 B1 | 9/2017 | Ning et al. |

(Continued)

FOREIGN PATENT DOCUMENTS

| CN | 101441076 A | 5/2009 |
| CN | 101966846 A | 2/2011 |

(Continued)

OTHER PUBLICATIONS

Extended European Search Report, Application No. 19187024.5, dated Jan. 24, 2020, 9 pages.

(Continued)

*Primary Examiner* — Timothy A Brainard
(74) *Attorney, Agent, or Firm* — Patterson Thuente Pedersen, P.A.

(57) ABSTRACT

A method and system for estimating an absolute velocity of an obstacle are provided. The method can include measuring an absolute velocity of a motor vehicle at a current moment t1 by an integrated navigation device, and storing the measured absolute velocity of the motor vehicle at the current moment t1 in a data table, obtaining a relative velocity of the obstacle relative to the motor vehicle at a second moment t2 by a millimeter wave radar; adjusting the relative velocity of the obstacle at the second moment t2 to a relative velocity of the obstacle at the current moment t1, and obtaining the absolute velocity of the obstacle at the current moment t1 by adding the absolute velocity of the motor vehicle at the current moment t1 to the relative velocity of the obstacle at the current moment t1 after an adjustment.

10 Claims, 5 Drawing Sheets

(56) References Cited

U.S. PATENT DOCUMENTS

| 9,812,838 | B2 | 11/2017 | Villeneuve et al. | |
|---|---|---|---|---|
| 2004/0030476 | A1 | 2/2004 | Oswald et al. | |
| 2006/0095192 | A1* | 5/2006 | Uhler | B60K 31/00 |
| | | | | 701/96 |
| 2006/0098872 | A1 | 5/2006 | Seo et al. | |
| 2010/0106356 | A1 | 4/2010 | Trepagnier et al. | |
| 2011/0282581 | A1 | 11/2011 | Zeng | |
| 2012/0245833 | A1* | 9/2012 | Zaitsu | G08G 1/167 |
| | | | | 701/117 |
| 2014/0032012 | A1 | 1/2014 | Joshi et al. | |
| 2017/0092000 | A1 | 3/2017 | Schwimmer | |
| 2017/0261318 | A1 | 9/2017 | Takagi et al. | |
| 2018/0189599 | A1 | 7/2018 | Sano et al. | |
| 2019/0187725 | A1 | 6/2019 | Zhang et al. | |

FOREIGN PATENT DOCUMENTS

| CN | 102663196 A | 9/2012 | | |
|---|---|---|---|---|
| CN | 103258338 A | 8/2013 | | |
| CN | 103649683 A | 3/2014 | | |
| CN | 103914830 A | 7/2014 | | |
| CN | 104020674 A | 9/2014 | | |
| CN | 104331910 A | 11/2014 | | |
| CN | 104183014 A | 12/2014 | | |
| CN | 104376297 A | 2/2015 | | |
| CN | 104422928 A | 3/2015 | | |
| CN | 104457569 A | 3/2015 | | |
| CN | 104899855 A | 9/2015 | | |
| CN | 104933708 A | 9/2015 | | |
| CN | 104933856 A | 9/2015 | | |
| CN | 104950883 A | 9/2015 | | |
| CN | 105761308 A | 7/2016 | | |
| CN | 105806353 A | 7/2016 | | |
| CN | 105844600 A | 8/2016 | | |
| CN | 105957145 A | 9/2016 | | |
| CN | 106204457 A | 12/2016 | | |
| CN | 106462757 A | 2/2017 | | |
| CN | 106585622 A | 4/2017 | | |
| CN | 106599832 A | 4/2017 | | |
| CN | 106681318 A | 5/2017 | | |
| CN | 106845412 A | 6/2017 | | |
| CN | 106919908 A | 7/2017 | | |
| CN | 104931977 B | 8/2017 | | |
| CN | 106997049 A | 8/2017 | | |
| CN | 107103627 A | 8/2017 | | |
| CN | 107305383 A | 10/2017 | | |
| CN | 107657237 A | 2/2018 | | |
| CN | 107659774 A | 2/2018 | | |
| CN | 107672589 A | 2/2018 | | |
| CN | 107678306 A | 2/2018 | | |
| CN | 107818293 A | 3/2018 | | |
| CN | 107832806 A | 3/2018 | | |
| CN | 107976688 A | 5/2018 | | |
| CN | 107993512 A | 5/2018 | | |
| CN | 108010360 A | 5/2018 | | |
| CN | 207407892 U | 5/2018 | | |
| CN | 108156419 A | 6/2018 | | |
| CN | 108256506 A | 7/2018 | | |
| CN | 108323190 A | 7/2018 | | |
| CN | 108492356 A | 9/2018 | | |
| CN | 108646735 A | 10/2018 | | |
| CN | 108698600 A | 10/2018 | | |
| CN | 109101022 A | 12/2018 | | |
| EP | 3346237 A1 | 7/2018 | | |
| JP | 2013015411 A | 1/2013 | | |
| JP | WO 2012/001755 A1 | 8/2013 | | |
| JP | 2015079223 A | 4/2015 | | |
| JP | 2015207171 A | 11/2015 | | |
| JP | 2017091273 A | 5/2017 | | |
| JP | 2018060511 A | 4/2018 | | |
| JP | 2018060512 A | 4/2018 | | |
| KR | 20160047087 A | 5/2016 | | |
| RO | 132599 A2 | 5/2018 | | |
| TW | 200945245 A | 11/2009 | | |
| TW | 201643063 A | 12/2016 | | |
| WO | WO-2017130639 A1 * | 8/2017 | | G08G 1/166 |
| WO | WO 2018/138584 A1 | 8/2018 | | |

OTHER PUBLICATIONS

Mammeri Abdelhamid et al., "Extending the Detection Range of Vision-Based Vehicular Instrumentation," IEEE Transactions on Instrumentation and Measurement, IEEE Service Center, Piscataway, NJ, US, vol. 65, No. 4, Apr. 1, 2016, pp. 856-873, XP011602110, ISSN: 0018-9456, DOI: 10.1109/TIM.2016.2514780.

Xiangyu Yue et al., "A LiDAR Point Cloud Generator: from a Virtual World to Autonomous Driving," ARXIV: 1804.00103V1, arxiv.org, Cornell University Library, 201 OLIN Library Cornell University Ithaca, NY 14853, Mar. 31, 2018, XP081225058, Retrieved from Internet: URL: https://arxiv.org/abs/1804.00103, 7 pages.

Christopher Gustav Keller et al., "Real-time recognition of U.S. speed signs," Intelligent Vehicles Symposium, 2008 IEEE, IEEE, Piscataway, NJ, USA, Jun. 4, 2008, pp. 518-823, XP031318927, ISBN: 978-1-4244-2568-6.

Gijs Dubbelman, "Vision based Obstacle Detection for both Day and Night Conditions," Dec. 31, 2006, XP055618096, Retrieved from the Internet: URL: https://staff.fnwi.uva.nl/a.visser/research/ias/alumni/m.sc.theses/theses/GijsDubbelman.pdf, 126 pages.

Alireza Asvadi et al., "DepthCN: Vehicle detection using 3D-LIDAR and ConvNet," 2017 IEEE 20th International Conference on Intelligent Transportation Systems (ITSC), IEEE, Oct. 16, 2017, pp. 1-6, XP033330533, DOI: 10.1109/ITSC.2017.8317880.

Agnieszka Mikolajczyk et al., "Data augmentation for improving deep learning in image classification problem," 2018 International Interdisciplinary PHD Workshop (IIPHDW), IEEE, May 9, 2018, pp. 117-122, XP033360783, DOI: 10.1109/IIPHDW.2018.8388338.

Raymond A. Yeh et al., "Semantic Image Inpainting with Deep Generative Models," ARXIV-1611.07004V2, Nov. 14, 2016, pp. 6882-6890, XP055532717, DOI: 10.1109/CVPR.2017.728, ISBN: 978-1-5386-0457-1.

Xiaohu Lu et al., "Pairwise Linkage for Point Cloud Segmentation," ISPRS Annals of Photogrammetry, Remote Sensing and Spatial Information Sciences, vol. III-3 Jun. 3, 2016, pp. 201-208, XP055647625, DOI: 10.5194/isprs-annals-III-3-201-2016.

Ma Ling, et al., "The Principle of Microwave Velocity Radar," College of Electronic Engineering and Optoelectronic Technology, NUST, Nanjing, 210094, Journal of Ballistics, vol. 15, No. 4, Dec. 31, 2003, 5 pages.

A. Mantovanelli, et al., "The Use of HR radar surface currents for computing Lagrangian trajectories: benefits and issues," Ocean "10 IEEE Sydney, May 27, 2010, 6 pages.

Search Report, Application No. 2018110456659, dated Feb. 28, 2020, 7 pages.

Japanese Office Action, Japanese Application No. 2019128860, dated Jun. 23, 2020, 6 pages.

* cited by examiner adjusting the relative velocity of the obstacle at the second moment t2 to a relative velocity of the obstacle at the current moment t1
106 obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located
110 determining the multiple types of obstacles having similar hypothetical absolute velocities and the greatest number in the scene at the current moment t1, as a type of reference obstacles; and averaging the hypothetical absolute velocities of the reference obstacles, to obtain an average error amount
112 obtaining the relative velocity of the obstacle at the current moment t1 after an adjustment by subtracting the average error amount from the relative velocity of the obstacle at the second moment t2
114

FIG. 2 system for estimating an absolute velocity of an obstacle
200

| integrated navigation device 202 | millimeter wave radar 204 |

| adjustment device 206 | adder 208 |

FIG. 4

METHOD AND DEVICE FOR ESTIMATING AN ABSOLUTE VELOCITY OF AN OBSTACLE, AND NON-VOLATILE COMPUTER-READABLE STORAGE MEDIUM

CROSS-REFERENCE TO RELATED APPLICATION

This application claims priority to Chinese Patent Application No. 201811045665.9, filed on Sep. 7, 2018, which is hereby incorporated by reference in its entirety.

TECHNICAL FIELD

The present disclosure relates to the field of motor vehicle driving, and in particular to a method for estimating an absolute velocity of an obstacle, a system for estimating an absolute velocity of an obstacle, and a non-volatile computer storage medium therefor.

BACKGROUND

In conventional technologies, the absolute velocity of an automatic driving vehicle (or, autonomous vehicle) is usually measured by an integrated navigation device, the relative velocity of an obstacle is measured by a millimeter wave radar, and the absolute velocity of the obstacle is obtained by adding the measurement result of the millimeter wave radar to the result from the integrated navigation device.

An integrated navigation device has accurate time stamps by means of a GPS, however, a millimeter wave radar only has time stamps while receiving data by a host. Therefore there is a time delay that can cause a superposition of data at two different instants, thereby resulting in an inaccurate measurement of the velocity of an obstacle.

SUMMARY

According to embodiments of the present disclosure, a method for estimating an absolute velocity of an obstacle, a system for estimating an absolute velocity of an obstacle, and a non-volatile computer storage medium are provided to solve one or more technical problems in the conventional technologies.

In a first aspect of the present disclosure, a method for estimating an absolute velocity of an obstacle is provided, which may include measuring an absolute velocity of a motor vehicle at a current moment t1 by an integrated navigation device, and storing the measured absolute velocity of the motor vehicle at the current moment t1 in a data table, obtaining a relative velocity of the obstacle relative to the motor vehicle at a second moment t2 by a millimeter wave radar; adjusting the relative velocity of the obstacle at the second moment t2 to a relative velocity of the obstacle at the current moment t1, and obtaining the absolute velocity of the obstacle at the current moment t1 by adding the absolute velocity of the motor vehicle at the current moment t1 to the relative velocity of the obstacle at the current moment t1 after an adjustment.

In embodiments, adjusting the relative velocity of the obstacle at the second moment t2 to a relative velocity of the obstacle at the current moment t1 includes: obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located, determining the multiple types of obstacles having similar hypothetical absolute velocities and the greatest number in the scene at the current moment t1, as a type of reference obstacles; and averaging the hypothetical absolute velocities of the reference obstacles, to obtain an average error amount; and obtaining the relative velocity of the obstacle at the current moment t1 after an adjustment by subtracting the average error amount from the relative velocity of the obstacle at the second moment t2.

In embodiments, obtaining the absolute velocity of the obstacle at the current moment t1 by adding the absolute velocity of the motor vehicle at the current moment t1 to the relative velocity of the obstacle at the current moment t1 after an adjustment includes: obtaining the absolute velocity of the obstacle at the current moment t1 by adding the absolute velocity of the motor vehicle at the current moment t1 to the relative velocity of the obstacle at the current moment t1 after an adjustment, in a case that the number of the reference obstacles is greater than a first threshold and/or the average error amount is less than a second threshold.

In embodiments, obtaining the absolute velocity of the obstacle at the current moment t1 by adding the absolute velocity of the motor vehicle at the current moment t1 to the relative velocity of the obstacle at the current moment t1 after an adjustment can include obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located, determining the multiple types of obstacles having similar hypothetical absolute velocities at the current moment t1, as multiple types of reference obstacles; and averaging the hypothetical absolute velocities of the reference obstacles, to obtain an average error amount, determining the number of each type of the reference obstacles detected by the millimeter wave radar and a detection period of the millimeter wave radar between adjacent detections, in a case that the number of each type of the reference obstacles is less than a first threshold and/or the average error amount is greater than a second threshold, obtaining, for each type of the reference obstacles, a function relationship among the number of reference obstacles, the detection period and a time difference t2−t1, wherein the time difference t2−t1 is a difference between the second moment t2 and the current moment t1.

In embodiments, the method may further include adjusting time data of the millimeter wave radar at the second moment t2 to time data of the millimeter wave radar at the current moment t1 according to the number of the reference obstacles detected by the millimeter wave radar and the detection period of the millimeter wave radar, to obtain the relative velocity of the obstacle at the current moment t1 after an adjustment, looking up an absolute velocity of the motor vehicle at the current moment t1 in the data table, and obtaining the absolute velocity of the obstacle at the current moment t1 by adding the absolute velocity of the motor vehicle at the current moment t1 to the relative velocity of the reference obstacles at the current moment t1 after an adjustment.

According to a second aspect of the present disclosure, a system for estimating an absolute velocity of an obstacle is provided, which may include an integrated navigation device, configured to measure an absolute velocity of a motor vehicle at a current moment t1, and to store the measured absolute velocity of the motor vehicle at the current moment t1 in a data table; a millimeter wave radar, configured to obtain a relative velocity of the obstacle relative to the motor vehicle at a second moment t2, an adjustment device, configured to adjust the relative velocity of the obstacle at the second moment t2 to a relative velocity of the obstacle at the current moment t1, and an adder, configured to obtain the absolute velocity of the obstacle at the current moment t1 by adding the absolute velocity of the motor vehicle at the current moment t1 to the relative velocity of the obstacle at the current moment t1 after an adjustment.

In embodiments, the adjustment device may be configured to: obtain respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located; determine the multiple types of obstacles having similar hypothetical absolute velocities and the greatest number in the scene at the current moment t1, as a type of reference obstacles; and averaging the hypothetical absolute velocities of the reference obstacles, to obtain an average error amount; and obtain the relative velocity of the obstacle at the current moment t1 after an adjustment by subtracting the average error amount from the relative velocity of the obstacle at the second moment t2.

In embodiments, the adder is further configured to: obtain the absolute velocity of the obstacle at the current moment t1 by adding the absolute velocity of the motor vehicle at the current moment t1 to the relative velocity of the obstacle at the current moment t1 after an adjustment, in a case that the number of the reference obstacles is greater than a first threshold and/or the average error amount is less than a second threshold.

In embodiments, the adjustment device is further configured to obtain respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located, determine the multiple types of obstacles having similar hypothetical absolute velocities at the current moment t1, as multiple types of reference obstacles; and averaging the hypothetical absolute velocities of the reference obstacles, to obtain an average error amount, determine the number of each type of the reference obstacles detected by the millimeter wave radar and a detection period of the millimeter wave radar between adjacent detections, in a case that the number of each type of the reference obstacles is less than a first threshold and/or the average error amount is greater than a second threshold and obtain, for each type of the reference obstacles, a function relationship among the number of reference obstacles, the detection period and a time difference t2−t1, wherein the time difference t2−t1 is a difference between the second moment t2 and the current moment t1.

In embodiments, the adjustment device is further configured to adjust time data of the millimeter wave radar at the second moment t2 to time data of the millimeter wave radar at the current moment t1 according to the number of the reference obstacles detected by the millimeter wave radar and the detection period of the millimeter wave radar, to obtain the relative velocity of the obstacle at the current moment t1 after an adjustment, and look up an absolute velocity of the motor vehicle at the current moment t1 in the data table, and obtaining the absolute velocity of the obstacle at the current moment t1 by adding the absolute velocity of the motor vehicle at the current moment t1 to the relative velocity of the reference obstacles at the current moment t1 after an adjustment.

In embodiments, a computer device is provided, which may include: one or more processors; a storage device for storing one or more programs; wherein the one or more programs, when executed by the one or more processors, implement the method described above.

According to a fourth aspect of the present disclosure, a non-volatile computer readable storage medium is provided, which has computer programs stored thereon, wherein the computer programs, when executed by a processor, cause the processor to implement the method described above.

By means of the technical solutions of the present disclosure, the relative velocity of an obstacle measured by a millimeter wave radar after an adjustment can be more accurate, so that after it is added to the absolute velocity of a motor vehicle measured by an integrated navigation device having an accurate time stamp feature of a GPS, the absolute velocity of the obstacle measured at a certain moment is obtained, which eliminates the time delay existing in the conventional technologies, thereby resulting in an more accurate measurement of the velocity of an obstacle.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

FIG. 2 is a flowchart schematically showing an adjustment of a relative velocity of an obstacle at a second moment t2 to a relative velocity of the obstacle at a current moment t1 according to an embodiment.

FIG. 4 is a block diagram schematically showing a system for estimating an absolute velocity of an obstacle according to an embodiment.

DETAILED DESCRIPTION

Hereinafter, example embodiments are described. As can be appreciated by those skilled in the art, the described embodiments may be modified in various different ways without departing from the spirit or scope of the present disclosure. Accordingly, the drawings and the description should be considered as illustrative in nature instead of being restrictive.

The term "obstacle" as referred to in various embodiments of the specification of the present disclosure can be understood broadly, such as pedestrians, bicycles, electric motorcycles, other non-motor vehicles or motor vehicles around the present motor vehicle, all of which can be considered as an obstacle relative to the host vehicle (motor vehicle).

The term "motor vehicle" as referred to in various embodiments of the present disclosure may be broadly understood, for example, it may include a vehicle having motorization characteristics, such as automatic driving vehicles, unmanned vehicles, manned vehicles, electric vehicles or the like.

The term "absolute velocity" as referred to in various embodiments of the present disclosure means a velocity relative to stationary objects, such as the ground.

The term "relative velocity" as referred to in various embodiments of the present disclosure means a velocity of an obstacle relative to a motor vehicle (the host vehicle); for example, in the case where the obstacle is a pedestrian, the term "relative velocity" refers to the velocity of the pedestrian obstacle relative to the motor vehicle; and in the case where the obstacle is a bicycle, the term "relative velocity" refers to the velocity of the bicycle obstacle relative to the motor vehicle, and the like.

In various embodiments of the present disclosure, the term "motor vehicle" is used to refer to the host vehicle, and "other motor vehicle(s)" refers to vehicle(s) other than the host vehicle.

In various embodiments of the present disclosure, the integrated navigation device, the millimeter wave radar, the adjustment device, the adder and the like, which will be mentioned later, can be mounted on a motor vehicle (the host vehicle), and may also not be mounted on a motor vehicle (the host vehicle) in certain cases.

Figure 1:
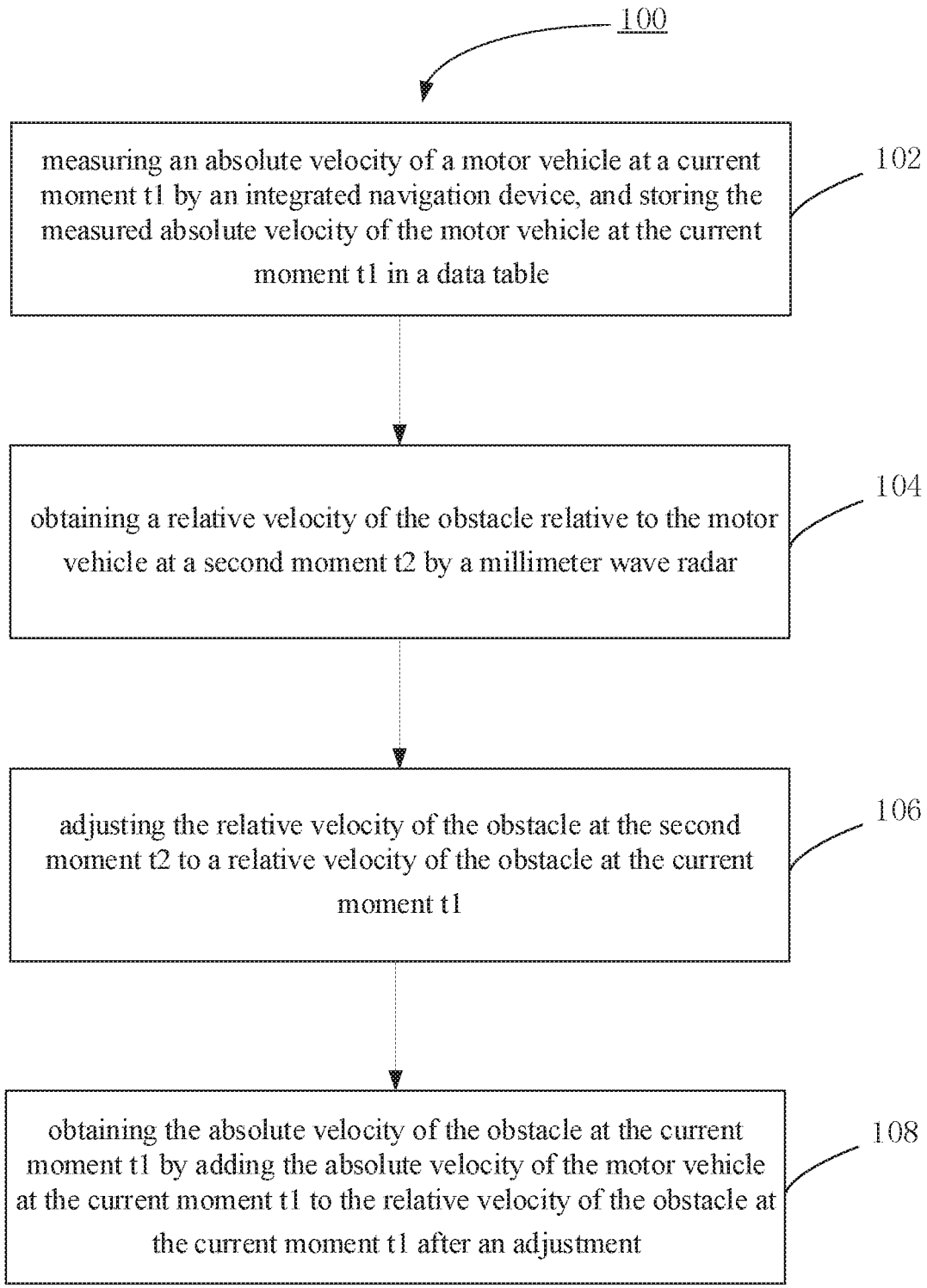
FIG. 1 is a flowchart schematically showing a method for estimating an absolute velocity of an obstacle according to an embodiment.

FIG. 1 illustrates a method for estimating an absolute velocity of an obstacle 100 according to an embodiment of the present disclosure. At 102, the method may include measuring an absolute velocity v_c(t1) of a motor vehicle at a current moment t1 by an integrated navigation device, and storing the measured absolute velocity of the motor vehicle at the current moment t1 in a data table. At 104 the method may include, obtaining a relative velocity v_r(t2) of the obstacle relative to the motor vehicle at a second moment t2 by a millimeter wave radar. At 106 the method may include adjusting the relative velocity v_r(t2) of the obstacle at the second moment t2 to a relative velocity v_r(t1) of the obstacle at the current moment t1. At 108, the method may include obtaining the absolute velocity of the obstacle at the current moment t1 by adding the absolute velocity v_c(t1) of the motor vehicle at the current moment t1 to the relative velocity v_r(t1) of the obstacle at the current moment t1 after an adjustment, i.e., v_a(t1)=v_r(t1)+v_c(t1).

At 102, an absolute velocity v_c(t1) of a motor vehicle at a current moment in time t1 can be measured by an integrated navigation device, and stored in a data table. It should be noted that the integrated navigation device has an accurate time stamp, which can, for example, measure the absolute velocity v_c(t1) of the motor vehicle (the host vehicle) at a specific moment, e.g., the current moment t1, relative to a stationary object such as the ground in real time. In many cases, the absolute velocity of the motor vehicle relative to the ground varies over time, and the absolute velocity of the motor vehicle at the current moment t1 can be accurately measured by means of an integrated navigation device having an accurate time stamp. The absolute velocity corresponding to the specific moment is stored in the data table for later use.

At 104, the obtaining a relative velocity v_r(t2) of the obstacle relative to the motor vehicle at a second moment t2 by a millimeter wave radar means that, a time difference exists between each two detections by the millimeter wave radar. In other words, there is a time delay. For example, in the event that it is necessary to detect the relative velocity of the obstacle at the current moment t1, the obtained measurement result is often a measurement result received by the millimeter wave radar at the next moment, for example, the second moment t2. Due to such time delay, the measurement result is not accurate, which cannot truly reflect the real relative velocity of an obstacle at the moment of the measurement relative to the motor vehicle. In other words, the time stamp of the millimeter wave radar receiving the relative velocity of the obstacle is the second moment t2, however, the actual measurement result (the relative velocity of the obstacle) is the relative velocity of the obstacle measured at a preceding moment, i.e., the current moment t1. Due to the existence of a time delay that the measurement result of the current moment t1 can only be received by the second moment t2, a subsequent adjustment step is required, that is, the measurement result received with a nominal time stamp of the second moment t2 is adjusted to a measurement result received with a time stamp of the current moment t1, so as to truly reflect the measurement result (relative velocity of the obstacle) at the adjusted time stamp.

In this case, it can be necessary, at 106, to adjust the relative velocity v_r(t2) of the obstacle at the second moment t2 to a relative velocity v_r(t1) of the obstacle at the current moment t1. The purpose of the adjustment is to truly reflect the actual relative velocity of the obstacle at the current moment t1. Adjusting the relative velocity v_r(t2) of the obstacle at the second moment t2 to a relative velocity v_r(t1) of the obstacle at the current moment t1 may include the activities depicted in FIG. 2.

At 110, the method can include obtaining respective hypothetical absolute velocities of multiple types of obstacles at the current moment t1, for example, v_a1(*t*1)=v_r1(*t*2)+v_c(t1); v_a2(*t*1)=v_r2(*t*2)+v_c(t1); v_a3(*t*1)=v_r3(*t*2)+v_c(t1) v_an(t1)=v_r3(*t*2)+v_c(t1) and so on, by adding relative velocities v_r1(*t*2), v_r2(*t*2), v_r3(*t*2) . . . v_rn(t2), etc. of the multiple types of obstacles at the second moment t2 to the absolute velocity v_c(t1) of the motor vehicle at the current moment t1, wherein the multiple types of obstacles are in the same scene in which the obstacle is located. The obtained hypothetical absolute velocities serve to lay a basis for the subsequent real processing. The respective hypothetical absolute velocities herein mean, for example, a hypothetical absolute velocity v_a1(*t*1) of pedestrian obstacles in the case of pedestrian obstacles, a hypothetical absolute velocity v_a2(*t*1) of bicycle obstacles in the case of bicycle obstacles, a hypothetical absolute velocity v_a3(*t*1) of other vehicle obstacles in the case of other vehicle obstacles, and the like.

Alternatively, at 112, the method can include determining the multiple types of obstacles having similar hypothetical absolute velocities v_a1(*t*1); v_a2(*t*1); v_a3(*t*1) . . . v_an(t1), etc. and the greatest number in the scene at the current moment t1, as a type of reference obstacles. For example, it may be found out that most obstacles in the scene where the plurality of obstacles are located move with the same velocity, for example, the velocity might be zero. This is because during the movement of a motor vehicle, many obstacles in the scene are stationary obstacles, such as trees, houses, bridges, roads, etc., and these stationary obstacles are precisely the reference for statistics and hypothesis. The determining the multiple types of obstacles having similar hypothetical absolute velocities $v\_a1(t1)$; $v\_a2(t1)$; $v\_a3(t1) \ldots v\_an(t1)$, etc. and the greatest number in the scene at the current moment t1, as a type of reference obstacles may for example involve $v\_a1(t1)$; $v\_a3(t1)$; $v\_a5(t1)$; $v\_a7(t1) \ldots v\_an(t1)$. Taking these reference obstacles having such velocities as stationary obstacles is a basis for subsequent adjustment processing. The hypothetical absolute velocities of the reference obstacles $v\_a1(t1)$; $v\_a3(t1)$; $v\_a5(t1)$; $v\_a7(t1) \ldots v\_an(t1)$ are averaged, to obtain an average error amount, that is, $\Delta v\_a = (v\_a1(t1) + v\_a3(t1) + v\_a5(t1) + v\_a7(t1) + \ldots + v\_an(t1))/m$, where m represents the number of the reference obstacles. In this way, the average error amount $\Delta v\_a$ is obtained.

In an embodiment of the first aspect of the present disclosure, the method may further include, at 114, obtaining the relative velocity of the obstacle at the current moment t1 after an adjustment $v\_r1(t1), v\_r2(t1), v\_r3(t1) \ldots v\_rn(t1)$ by subtracting the average error amount $\Delta v\_a$ from the relative velocity of the obstacle at the second moment t2 $v\_r1(t2), v\_r2(t2), v\_r3(t2) \ldots v\_rn(t2)$. For example, for a pedestrian obstacle, the relative velocity of the pedestrian obstacle at the current moment t1 after an adjustment $v\_r1(t1)$, that is, $v\_r1(t1) = v\_r1(t2) - \Delta v\_a$, is obtained by subtracting the average error amount $\Delta v\_a$ from the relative velocity of the obstacle at the second moment t2 $v\_r1(t2)$; for a bicycle obstacle, the relative velocity of the bicycle obstacle at the current moment t1 after an adjustment $v\_r2(t1)$, that is, $v\_r2(t1) = v\_r2(t2) - \Delta v\_a$, is obtained by subtracting the average error amount $\Delta v\_a$ from the relative velocity of the obstacle at the second moment t2 $v\_r2(t2)$; for other vehicle obstacles, the relative velocity of said other vehicle obstacle at the current moment t1 after an adjustment $v\_r3(t1)$, that is, $v\_r3(t1) = v\_r3(t2) - \Delta v\_a$, is obtained by subtracting the average error amount $\Delta v\_a$ from the relative velocity of the obstacle at the second moment t2 $v\_r3(t2)$; and so on.

Figure 3:
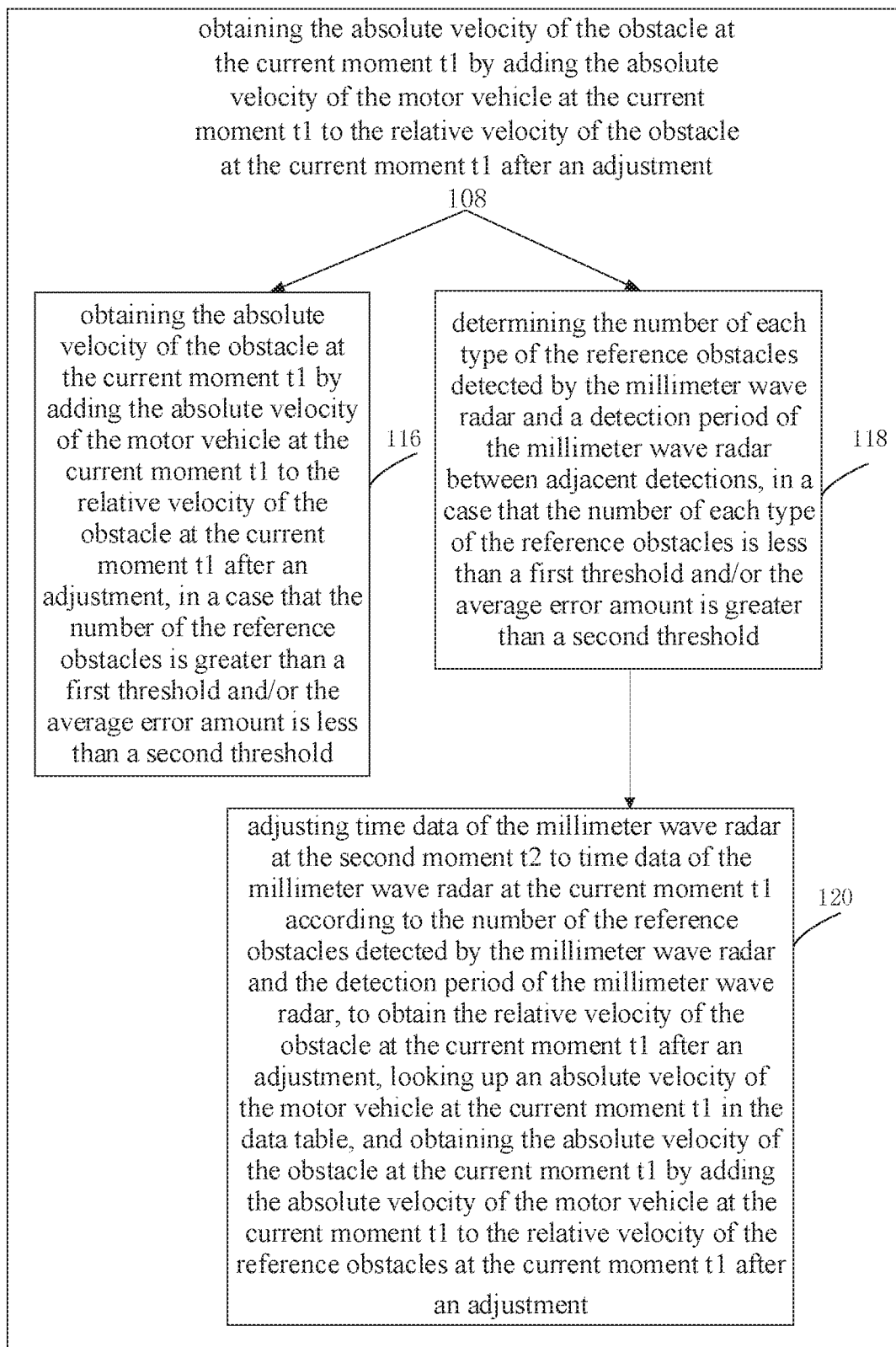
FIG. 3 is a flowchart schematically showing that an absolute velocity of an obstacle at a current moment t1 is obtained by adding an absolute velocity of a motor vehicle at the current moment t1 to a relative velocity of the obstacle at the current moment t1 after an adjustment, according to an embodiment.

As depicted in the flowchart of FIG. 3, in an embodiment of the first aspect of the present disclosure, the activity at 108 of obtaining the absolute velocity of the obstacle at the current moment t1 by adding the absolute velocity $v\_c(t1)$ of the motor vehicle at the current moment t1 to the relative velocity $v\_r(t1)$ of the obstacle at the current moment t1 after an adjustment (i.e., $v\_a(t1) = v\_r(t1) + v\_c(t1)$) may include, at 116, obtaining the absolute velocity $v\_a(t1)$ of the obstacle at the current moment t1 by adding the absolute velocity $v\_c(t1)$ of the motor vehicle at the current moment t1 to the relative velocity $v\_r(t1)$ of the obstacle at the current moment t1 after an adjustment, i.e., $v\_a(t1) = v\_r(t1) + v\_c(t1)$, in a case that the number of the reference obstacles is greater than a first threshold and/or the average error amount is less than a second threshold. This is the first case.

It should be noted that the number m of the reference obstacles being greater than the first threshold means that about 80% of the obstacles in a scene can be assumed to be stationary obstacles, and the remaining about 20% are moving obstacles of different types with different moving velocities. It can also be assumed that about 70% of obstacles in a scene are stationary obstacles, and the remaining about 30% are moving obstacles of different types with different moving velocities. The percentage of stationary obstacles assumed in a scene does not affect the scientific value of the present disclosure, as it is indeed that the majority of obstacles in a scene may be stationary obstacles, only with the exception in special circumstances. In a scene, in a case that the number m of the reference obstacles is greater than ten, it can be considered that the criterion that the number m of the reference obstacles being greater than a first threshold is fulfilled. The first threshold can also be preset as required to 15, 20, 25 or 30, etc. The error amount refers to the measured absolute velocity $v\_a$ of the obstacle, and the error amount being less than the second threshold means that the measured absolute velocity $v\_a$ of the obstacle is less than, for example, 0.5 km/h, 0.4 km/h, 0.3 km/h, and the like. The second threshold assumed herein, i.e., 0.5 km/h, 0.4 km/h, 0.3 km/h, etc., can be also specifically preset upon different conditions. If the number m of reference obstacles is greater than the first threshold and/or the average error amount is less than the second threshold, it is deemed that the first criterion or the first case as described above is satisfied, and then the absolute velocity of the obstacle at the current moment t1 can be obtained by directly adding the absolute velocity $v\_c(t1)$ of the motor vehicle at the current moment t1 to the relative velocity $v\_r(t1)$ of the obstacle at the current moment t1 after the adjustment, i.e., $v\_a(t1) = v\_c(t1) + v\_r(t1)$, where $v\_r(t1) = v\_r(t2) - \Delta v\_a$.

In another embodiment of the present disclosure, the obtaining the absolute velocity of the obstacle at the current moment t1 by adding the absolute velocity $v\_c(t1)$ of the motor vehicle at the current moment t1 to the relative velocity $v\_r(t1)$ of the obstacle at the current moment t1 after an adjustment (i.e., $v\_a(t1) = v\_r(t1) + v\_c(t1)$) may further include the following case.

The method can include obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located, determining the multiple types of obstacles having similar hypothetical absolute velocities at the current moment t1, as multiple types of reference obstacles; and averaging the hypothetical absolute velocities of the reference obstacles, to obtain an average error amount, determining the number of each type of the reference obstacles detected by the millimeter wave radar and a detection period of the millimeter wave radar between adjacent detections, in a case that the number of each type of the reference obstacles is less than a first threshold and/or the average error amount is greater than a second threshold, and obtaining, for each type of the reference obstacles, a function relationship among the number of reference obstacles, the detection period and a time difference t2−t1, wherein the time difference t2−t1 is a difference between the second moment t2 and the current moment t1.

As shown at 118 of FIG. 3, in a case that the number of each type of the reference obstacles is less than a first threshold and/or the average error amount is greater than a second threshold, the number of each type of the reference obstacles detected by the millimeter wave radar and a detection period of the millimeter wave radar between adjacent detections are determined, thereby a function relationship among the number of reference obstacles, the detection period and a time difference t2−t1 is obtained, for each type of the reference obstacles, wherein the time difference t2−t1 is a difference between the second moment t2 and the current moment t1.

It should be noted herein that the number m of the reference obstacles being less than the first threshold means that the number m of the reference obstacles is less than 10, 15, 20, 25 or 30, and the like. The average error amount being greater than the second threshold means that the measured absolute velocity v_a of the obstacle is greater than, for example, 0.5 km/h, 0.4 km/h, 0.3 km/h, and the like. The number m of the reference obstacles being less than the first threshold and/or the average error amount being greater than the second threshold means that it is impossible to obtain the absolute velocity v_a(t1)=v_c(t1)+v_r(t1) of the obstacle at the current moment t1 by adding the absolute velocity v_c(t1) of the motor vehicle at the current moment t1 to the relative velocity v_r(t1) of the obstacle at the current moment t1 after an adjustment directly, where v_r (t1)=v_r(t2)−Δv_a, as in the first case described above. In this case, a second processing method is required. That is, the number N of each type of the reference obstacles detected by the millimeter wave radar and a detection period T of the millimeter wave radar between adjacent detections are determined, thereby obtaining, for each type of the reference obstacles, a function relationship among the number N of reference obstacles, the detection period T and a time difference Δt=t2−t1, wherein the time difference is a difference between the second moment t2 and the current moment t1.

For example, when the number N of each type of the reference obstacles (road obstacles) is determined as N1, the detection period T of the millimeter wave radar between adjacent detections is determined as T1, and the corresponding time difference between the second moment t2 and the current moment t1 is Δt1=t2−t1, then there is a function Δt1=f(N1, T1). When the number N of each type of the reference obstacles (house obstacles) is determined as N2, the detection period T of the millimeter wave radar between adjacent detections is determined as T2, and the corresponding time difference between the second moment t2' and the current moment t1' is Δt1'=t2'−t1', then there is a function Δt1'=f(N2, T2). When the number N of each type of the reference obstacles (tree obstacles) is determined as N3, the detection period T of the millimeter wave radar between adjacent detections is determined as T3, and the corresponding time difference between the second moment t2" and the current moment t1" is Δt1"=t2"−t1", then there is a function Δt1"=f(N3, T3), and so on.

The final function obtained by fitting can be Δt=f(N,T). As for how to fit functions in several special cases, for example, Δt1=f(N1, T1); Δt1'=f(N2, T2); Δt1"=f(N3,T3); . . . Δt1‴=f (Nn, Tn) to obtain the final function Δt=f(N,T), those skilled in the art can readily find a solution according to the fitting technique in mathematics. For example, the commonly used fitting methods include a minimum square curve fitting method or the like, which would not be described herein specifically since they are not the inventive point of the present disclosure.

In an embodiment of the first aspect of the present disclosure, as shown at 120 of FIG. 3, time data of the millimeter wave radar at the second moment t2 can be adjusted to time data of the millimeter wave radar at the current moment t1 according to the number (e.g., N1') of the reference obstacles detected by the millimeter wave radar and the detection period T1' of the millimeter wave radar, an absolute velocity v_c(t1) of the motor vehicle measured by the integrated navigation device corresponding to the current moment t1 is looked up in the above mentioned data table, and the absolute velocity of the obstacle at the current moment t1, i.e., v_a(t1)=v_c(t1)+v_r(t1), is obtained by adding the absolute velocity of the motor vehicle at the current moment t1 to the relative velocity v_r(t1) of the reference obstacles at the current moment t1 after an adjustment.

In the second case, the absolute velocity v_a(t1)=v_c(t1)+v_r(t1) of the obstacle at the current moment t1 can be obtained by training data, for example according to the preliminarily obtained binary functions Δt1=f(N1,T1); Δt1'=f(N2,T2); Δt1"=f(N3,T3); . . . Δt1‴=f(Nn,Tn), a function Δt=f(N,T) is finally obtained by fitting. According to this function, in a specific case, that is, when the number m of each type of the reference obstacles is less than the first threshold and/or the average error amount is greater than the second threshold, assuming that the number N1' of the obstacles and the detection period T1' are already known, the corresponding time delay Δt is obtained according to Δt=f (N, T) so as to adjust the time stamp of the millimeter wave radar data, and the time stamp of the second moment t2 is adjusted to the current moment t1. The relative velocity v_r(t1) of the obstacle corresponding to the closest integrated navigation data can be searched for according to the time stamp t1, and the absolute velocity v_c(t1) of the motor vehicle measured by the integrated navigation device can be added to the relative velocity v_r(t1) of the obstacle at the current moment t1 after the adjustment to obtain the absolute value of the obstacle at the current moment t1, i.e., v_a (t1)=v_c (t1)+v_r (t1).

By means of the technical solutions of the present disclosure, the relative velocity of the obstacle measured by the millimeter wave radar after an adjustment can be more accurate, so that after it is added to the absolute velocity of a motor vehicle measured by an integrated navigation device having an accurate time stamp feature of a GPS, the absolute velocity of the obstacle measured at a certain moment is obtained, which eliminates the time delay existing in the conventional technologies, thereby resulting in an more accurate measurement of the velocity of an obstacle.

According to a second aspect of the present disclosure, as shown in FIG. 4, a system for estimating an absolute velocity of an obstacle 200 is provided, which may include an integrated navigation device 202 configured to measure an absolute velocity of a motor vehicle at a current moment t1, and to store the measured absolute velocity of the motor vehicle at the current moment t1 in a data table, a millimeter wave radar 204, configured to obtain a relative velocity of the obstacle relative to the motor vehicle at a second moment t2, an adjustment device 206, configured to adjust the relative velocity of the obstacle at the second moment t2 to a relative velocity at the current moment t1, and an adder 208 configured to obtain the absolute velocity of the obstacle at the current moment t1 by adding the absolute velocity of the motor vehicle at the current moment t1 to the relative velocity of the obstacle at the current moment t1 after an adjustment.

In embodiments, the adjustment device 206 may be further configured to: obtain respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located, determine the multiple types of obstacles having similar hypothetical absolute velocities and the greatest number in the scene at the current moment t1, as a type of reference obstacles, and averaging the hypothetical absolute velocities of the reference obstacles, to obtain an average error amount, and obtain the relative velocity of the obstacle at the current moment t1 after an adjustment by subtracting the average error amount from the relative velocity of the obstacle at the second moment t2.

In embodiments the adder can be further configured to obtain the absolute velocity of the obstacle at the current moment t1 by adding the absolute velocity of the motor vehicle at the current moment t1 to the relative velocity of the obstacle at the current moment t1 after an adjustment when the number of the reference obstacles is greater than a first threshold and/or the average error amount is less than a second threshold.

In embodiments, the adjustment device can be further configured to obtain respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in the same scene in which the obstacle is located, determine the multiple types of obstacles having similar hypothetical absolute velocities at the current moment t1, as multiple types of reference obstacles; and averaging the hypothetical absolute velocities of the reference obstacles, to obtain an average error amount, determine the number of each type of the reference obstacles detected by the millimeter wave radar and a detection period of the millimeter wave radar between adjacent detections, in a case that the number of each type of the reference obstacles is less than a first threshold and/or the average error amount is greater than a second threshold, and obtain, for each type of the reference obstacles, a function relationship among the number of reference obstacles, the detection period and a time difference t2-t1, wherein the time difference t2-t1 is a difference between the second moment t2 and the current moment t1.

In embodiments, the adjustment device can be further configured to adjust time data of the millimeter wave radar at the second moment t2 to time data of the millimeter wave radar at the current moment t1 according to the number of the reference obstacles detected by the millimeter wave radar and the detection period of the millimeter wave radar, to obtain the relative velocity of the obstacle at the current moment t1 after an adjustment, and look up an absolute velocity of the motor vehicle at the current moment t1 in the data table, and obtaining the absolute velocity of the obstacle at the current moment t1 by adding the absolute velocity of the motor vehicle at the current moment t1 to the relative velocity of the reference obstacles at the current moment t1 after an adjustment.

In embodiments, a computer device is provided. The device may include one or more processors and a storage device for storing one or more programs, wherein the one or more programs, when executed by the one or more processors, implement the method described above.

In an embodiment of the fourth aspect of the present disclosure, a non-volatile computer readable storage medium is provided, which has computer programs stored thereon, wherein the computer programs, when executed by a processor, cause the processor to implement the method described above.

Figure 5:
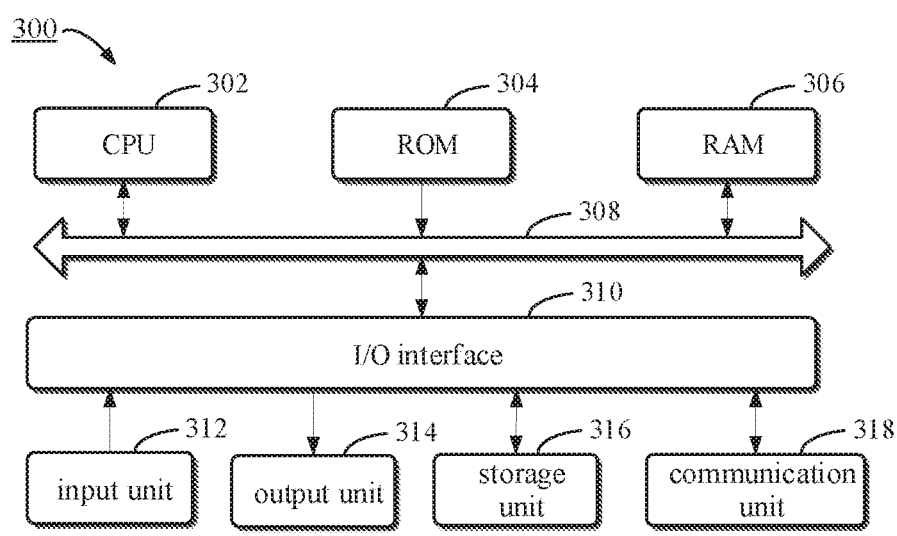
FIG. 5 schematically shows an embodiment of a computer device.

For example, FIG. 5 shows a schematic block diagram of an example computer device 300 that can be used to implement embodiments of the present disclosure. It should be appreciated that the computer device 300 can be used to implement the method for estimating an absolute velocity of an obstacle described in the present disclosure. As shown in the drawing, the computer device 300 includes a central processing unit (CPU) 302 that can execute various proper actions and processing according to computer program instructions stored in a read only memory (ROM) 304 or computer program instructions loaded from a storage unit 316 into a random access memory (RAM) 306. In the RAM 306, various programs and data required for the operation of the computer device 300 can also be stored. The CPU 302, the ROM 304, and the RAM 306 are connected to each other through a bus 308. An input/output (I/O) interface 310 is also connected to the bus 308.

A plurality of components in the computer device 300 are connected to the I/O interface 310, which include: an input unit 312, such as a keyboard, a mouse, etc.; an output unit 314, such as various types of displays and speakers, etc.; a storage unit 316, such as a magnetic disk, an optical disk, etc.; and a communication unit 318, such as a network card, a modem, a wireless communication transceiver, and the like. The communication unit 318 allows the computer device 300 to exchange information/data with other devices over a computer network such as the Internet and/or various telecommunication networks.

The processing unit 302 performs the various aforementioned methods and processes, such as the method 100. For example, in some embodiments, the method 100 can be implemented as a computer software program that is tangibly embodied in a machine readable medium, such as the storage unit 316. In some embodiments, some or all of the computer programs can be loaded and/or installed onto the computer device 300 via the ROM 304 and/or communication unit 318. One or more actions or steps of the method 100 described above may be executed when the computer program is loaded into RAM 306 and executed by CPU 62. Alternatively, in other embodiments, CPU 302 may be configured to perform the method 100 by any other suitable means (e.g., by means of firmware).

The functions described above herein may be performed at least in part by one or more hardware logic components. By way of example without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a non-volatile computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a non-volatile computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A method for estimating an absolute velocity of an obstacle, comprising:
    measuring an absolute velocity of a motor vehicle at a current moment t1 by an integrated navigation device, and storing the measured absolute velocity of the motor vehicle at the current moment t1 in a data table;
    obtaining a relative velocity of the obstacle relative to the motor vehicle at a second moment t2 by a millimeter wave radar;
    adjusting the relative velocity of the obstacle at the second moment t2 to a relative velocity of the obstacle at the current moment t1; and
    obtaining the absolute velocity of the obstacle at the current moment t1 by adding the absolute velocity of the motor vehicle at the current moment t1 to the relative velocity of the obstacle at the current moment t1 after the adjusting;
    wherein adjusting the relative velocity of the obstacle at the second moment t2 to the relative velocity of the obstacle at the current moment t1 comprises:
    obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in a scene in which the obstacle is located;
    determining the multiple types of obstacles having similar hypothetical absolute velocities and the greatest number in the scene at the current moment t1, as a type of reference obstacles; and averaging the hypothetical absolute velocities of the reference obstacles, to obtain an average error amount; and
    obtaining the relative velocity of the obstacle at the current moment t1 after the adjusting by subtracting the average error amount from the relative velocity of the obstacle at the second moment t2.

2. The method of claim 1, wherein obtaining the absolute velocity of the obstacle at the current moment t1 by adding the absolute velocity of the motor vehicle at the current moment t1 to the relative velocity of the obstacle at the current moment t1 after the adjusting comprises:
    obtaining the absolute velocity of the obstacle at the current moment t1 by adding the absolute velocity of the motor vehicle at the current moment t1 to the relative velocity of the obstacle at the current moment t1 after the adjusting, in a case that the number of the reference obstacles is greater than a first threshold and/or the average error amount is less than a second threshold.

3. A method for estimating an absolute velocity of an obstacle, comprising:

measuring an absolute velocity of a motor vehicle at a current moment t1 by an integrated navigation device, and storing the measured absolute velocity of the motor vehicle at the current moment t1 in a data table;

obtaining a relative velocity of the obstacle relative to the motor vehicle at a second moment t2 by a millimeter wave radar;

adjusting the relative velocity of the obstacle at the second moment t2 to a relative velocity of the obstacle at the current moment t1; and obtaining the absolute velocity of the obstacle at the current moment t1 by adding the absolute velocity of the motor vehicle at the current moment t1 to the relative velocity of the obstacle at the current moment t1 after the adjusting;

wherein obtaining the absolute velocity of the obstacle at the current moment t1 by adding the absolute velocity of the motor vehicle at the current moment t1 to the relative velocity of the obstacle at the current moment t1 after the adjusting comprises:

obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in a scene in which the obstacle is located;

determining the multiple types of obstacles having similar hypothetical absolute velocities at the current moment t1, as multiple types of reference obstacles; and averaging the hypothetical absolute velocities of the reference obstacles, to obtain an average error amount;

determining the number of each type of the reference obstacles detected by the millimeter wave radar and a detection period of the millimeter wave radar between adjacent detections, in a case that the number of each type of the reference obstacles is less than a first threshold and/or the average error amount is greater than a second threshold; and obtaining, for each type of the reference obstacles, a function relationship among the number of reference obstacles, the detection period and a time difference t2−t1, wherein the time difference t2−t1 is a difference between the second moment t2 and the current moment t1.

4. The method of claim 3, further comprising:

adjusting time data of the millimeter wave radar at the second moment t2 to time data of the millimeter wave radar at the current moment t1 according to the number of the reference obstacles detected by the millimeter wave radar and the detection period of the millimeter wave radar, to obtain the relative velocity of the obstacle at the current moment t1 after the adjusting;

looking up the absolute velocity of the motor vehicle at the current moment t1 in the data table, and obtaining the absolute velocity of the obstacle at the current moment t1 by adding the absolute velocity of the motor vehicle at the current moment t1 to the relative velocity of the reference obstacles at the current moment t1 after the adjusting.

5. A system for estimating an absolute velocity of an obstacle, comprising:

one or more processors;

a storage device for storing one or more programs; wherein the one or more programs are executed by the one or more processors to enable the one or more processors to measure an absolute velocity of a motor vehicle at a current moment t1, and to store the measured absolute velocity of the motor vehicle at the current moment t1 in a data table;

obtain a relative velocity of the obstacle relative to the motor vehicle at a second moment t2;

adjust the relative velocity of the obstacle at the second moment t2 to a relative velocity of the obstacle at the current moment t1; and obtain the absolute velocity of the obstacle at the current moment t1 by adding the absolute velocity of the motor vehicle at the current moment t1 to the relative velocity of the obstacle at the current moment t1 after the adjusting;

wherein the one or more programs are executed by the one or more processors to enable the one or more processors to:

obtain respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in a scene in which the obstacle is located;

determine the multiple types of obstacles having similar hypothetical absolute velocities and the greatest number in the scene at the current moment t1, as a type of reference obstacles; and averaging the hypothetical absolute velocities of the reference obstacles, to obtain an average error amount; and obtain the relative velocity of the obstacle at the current moment t1 after the adjusting by subtracting the average error amount from the relative velocity of the obstacle at the second moment t2.

6. The system of claim 5, wherein the one or more programs are executed by the one or more processors to enable the one or more processors to:

obtain the absolute velocity of the obstacle at the current moment t1 by adding the absolute velocity of the motor vehicle at the current moment t1 to the relative velocity of the obstacle at the current moment t1 after the adjusting, in a case that the number of the reference obstacles is greater than a first threshold and/or the average error amount is less than a second threshold.

7. A system for estimating an absolute velocity of an obstacle, comprising:

one or more processors;

a storage device for storing one or more programs; wherein the one or more programs are executed by the one or more processors to enable the one or more processors to:

measure an absolute velocity of a motor vehicle at a current moment t1, and to store the measured absolute velocity of the motor vehicle at the current moment t1 in a data table;

obtain a relative velocity of the obstacle relative to the motor vehicle at a second moment t2;

adjust the relative velocity of the obstacle at the second moment t2 to a relative velocity of the obstacle at the current moment t1; and obtain the absolute velocity of the obstacle at the current moment t1 by adding the absolute velocity of the motor vehicle at the current moment t1 to the relative velocity of the obstacle at the current moment t1 after the adjusting;

obtain respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in a scene in which the obstacle is located;

determine the multiple types of obstacles having similar hypothetical absolute velocities at the current moment t1, as multiple types of reference obstacles; and averaging the hypothetical absolute velocities of the reference obstacles, to obtain an average error amount;

determine the number of each type of the reference obstacles detected by a millimeter wave radar and a detection period of the millimeter wave radar between adjacent detections, in a case that the number of each type of the reference obstacles is less than a first threshold and/or the average error amount is greater than a second threshold; and obtain, for each type of the reference obstacles, a function relationship among the number of reference obstacles, the detection period and a time difference t2–t1, wherein the time difference t2–t1 is a difference between the second moment t2 and the current moment t1.

8. The system of claim 7, wherein the one or more programs are executed by the one or more processors to enable the one or more processors to:

adjust time data of the millimeter wave radar at the second moment t2 to time data of the millimeter wave radar at the current moment t1 according to the number of the reference obstacles detected by the millimeter wave radar and the detection period of the millimeter wave radar, to obtain the relative velocity of the obstacle at the current moment t1 after the adjusting; and look up the absolute velocity of the motor vehicle at the current moment t1 in the data table, and obtaining the absolute velocity of the obstacle at the current moment t1 by adding the absolute velocity of the motor vehicle at the current moment t1 to the relative velocity of the reference obstacles at the current moment t1 after the adjusting.

9. A non-transitory computer-readable storage medium having computer programs stored thereon, wherein the computer programs, when executed by a processor, cause the processor to perform operations of:

measuring an absolute velocity of a motor vehicle at a current moment t1 by an integrated navigation device, and storing the measured absolute velocity of the motor vehicle at the current moment t1 in a data table;

obtaining a relative velocity of the obstacle relative to the motor vehicle at a second moment t2 by a millimeter wave radar;

adjusting the relative velocity of the obstacle at the second moment t2 to a relative velocity of the obstacle at the current moment t1; and obtaining the absolute velocity of the obstacle at the current moment t1 by adding the absolute velocity of the motor vehicle at the current moment t1 to the relative velocity of the obstacle at the current moment t1 after the adjusting;

wherein when the computer programs, executed by a processor, cause the processor to adjust the relative velocity of the obstacle at the second moment t2 to the relative velocity of the obstacle at the current moment t1, the computer programs, executed by a processor, cause the processor to specifically perform operations of:

obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in a scene in which the obstacle is located;

determining the multiple types of obstacles having similar hypothetical absolute velocities and the greatest number in the scene at the current moment t1, as a type of reference obstacles; and averaging the hypothetical absolute velocities of the reference obstacles, to obtain an average error amount; and obtaining the relative velocity of the obstacle at the current moment t1 after the adjusting by subtracting the average error amount from the relative velocity of the obstacle at the second moment t2.

10. A non-transitory computer-readable storage medium having computer programs stored thereon, wherein the computer programs, when executed by a processor, cause the processor to perform operations of:

measuring an absolute velocity of a motor vehicle at a current moment t1 by an integrated navigation device, and storing the measured absolute velocity of the motor vehicle at the current moment t1 in a data table;

obtaining a relative velocity of the obstacle relative to the motor vehicle at a second moment t2 by a millimeter wave radar;

adjusting the relative velocity of the obstacle at the second moment t2 to a relative velocity of the obstacle at the current moment t1; and obtaining the absolute velocity of the obstacle at the current moment t1 by adding the absolute velocity of the motor vehicle at the current moment t1 to the relative velocity of the obstacle at the current moment t1 after the adjusting;

wherein when the computer programs, executed by a processor, cause the processor to obtain the absolute velocity of the obstacle at the current moment t1 by adding the absolute velocity of the motor vehicle at the current moment t1 to the relative velocity of the obstacle at the current moment t1 after the adjusting, the computer programs, executed by a processor, cause the processor to specifically perform operations of:

obtaining respective hypothetical absolute velocities of multiple types of obstacles at the current moment t1 by adding relative velocities of the multiple types of obstacles at the second moment t2 to the absolute velocity of the motor vehicle at the current moment t1, wherein the multiple types of obstacles are in a scene in which the obstacle is located;

determining the multiple types of obstacles having similar hypothetical absolute velocities at the current moment t1, as multiple types of reference obstacles; and averaging the hypothetical absolute velocities of the reference obstacles, to obtain an average error amount;

determining the number of each type of the reference obstacles detected by the millimeter wave radar and a detection period of the millimeter wave radar between adjacent detections, in a case that the number of each type of the reference obstacles is less than a first threshold and/or the average error amount is greater than a second threshold; and obtaining, for each type of the reference obstacles, a function relationship among the number of reference obstacles, the detection period and a time difference t2−t1, wherein the time difference t2−t1 is a difference between the second moment t2 and the current moment t1.

* * * * *